(12) United States Patent
Yu et al.

(10) Patent No.: US 11,247,744 B2
(45) Date of Patent: Feb. 15, 2022

(54) LAP COUNTING METHOD AND DEVICE

(71) Applicant: QINGDAO MAGENE INTELLIGENCE TECHNOLOGY CO., LTD., Qingdao (CN)

(72) Inventors: Feng Yu, Qingdao (CN); Fanbin Kong, Qingdao (CN); Lizhen Zhang, Qingdao (CN)

(73) Assignee: QINGDAO MAGENE INTELLIGENCE TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/048,102

(22) PCT Filed: Apr. 16, 2019

(86) PCT No.: PCT/CN2019/082806
§ 371 (c)(1),
(2) Date: Oct. 16, 2020

(87) PCT Pub. No.: WO2020/048134
PCT Pub. Date: Mar. 12, 2020

(65) Prior Publication Data
US 2021/0114679 A1    Apr. 22, 2021

(30) Foreign Application Priority Data
Sep. 7, 2018 (CN) .......................... 201811044440.1

(51) Int. Cl.
*B62J 45/411* (2020.01)
*G01C 22/00* (2006.01)

(52) U.S. Cl.
CPC .......... *B62J 45/411* (2020.02); *G01C 22/002* (2013.01)

(58) Field of Classification Search
CPC ......... B62J 45/40; B62J 45/411; G01C 22/00; G01C 22/002
See application file for complete search history.

(56) References Cited

U.S. PATENT DOCUMENTS

| 11,033,217 | B2* | 6/2021 | Wakeham | ................. G01L 1/22 |
| 2019/0300115 | A1* | 10/2019 | Shahana | .................. B62M 6/50 |
| 2020/0254307 | A1* | 8/2020 | Walthert | ................. G01S 19/01 |

FOREIGN PATENT DOCUMENTS

| CN | 2909177 Y | 6/2007 |
| CN | 205246089 U | 5/2016 |

(Continued)

*Primary Examiner* — Minnah L Seoh
*Assistant Examiner* — Harold Eric Pahlck, III
(74) *Attorney, Agent, or Firm* — Bayramoglu Law Offices LLC

(57) ABSTRACT

A lap counting method and device is provided. The lap counting method and device is applied to a non-motorized vehicle, and the non-motorized vehicle is provided with a torque sensor. The lap counting method includes: S110, obtaining data of the torque sensor in real time; S120, obtaining real-time torque data according to the data of the torque sensor; S130, obtaining a change period of the real-time torque data according to the real-time torque data; and S140, determining lap counting data according to the change period, wherein the lap counting marking point is a peak value of the change period. Since the lap counting is performed by means of a periodic change of the torque acting on a crank of a bicycle, data is stable and free from interference caused by external factors, and the lap counting is stable and reliable.

7 Claims, 2 Drawing Sheets

(56) References Cited

FOREIGN PATENT DOCUMENTS

| | | | |
|---|---|---|---|
| CN | 107782331 | A | 3/2018 |
| CN | 108460450 | A | 8/2018 |
| CN | 109238300 | A | 1/2019 |
| JP | 2011174740 | A | 9/2011 |

* cited by examiner

LAP COUNTING METHOD AND DEVICE

CROSS REFERENCE TO THE RELAYED APPLICATIONS

This application is the national phase entry of International Application No. PCT/CN2019/082806, filed on Apr. 16, 2019, which is based upon and claims priority to Chinese Patent Application No. 201811044440.1, filed on Sep. 7, 2018, the entire contents of which are incorporated herein by reference.

TECHNICAL FIELD

The present invention relates to the technical field of automatic lap counting, in particular to a lap counting method and device.

BACKGROUND

Due to today's promotions of low-carbon environmental protection plans and green travel initiatives, more people feel encouraged to participate in cycling. Cycling is a healthy activity which also allows cyclists to enjoy the scenery during their cycling journey. At any time, a cyclist may make the environmentally friendly decision to travel with only a bike and a backpack, which is a simple way to travel. Cycling is also a great choice of commuting every day, which not only provides health benefits to avoid discomfort caused by prolonged sitting in an office-type setting, but also helps to avoid facing the frustration of traffic congestion. As a result of the popular benefits, there is a growing number of people engaged in cycling, and their cycling equipment is becoming specialized, such as automatic lap counting products that provide statistics on cycling data for cyclists.

However, during the implementation of the technical solution in the embodiment of the present invention, the applicant finds that the above existing technologies have at least the following technical problems.

In the prior art, the lap counting method such as magnetic lap counting or acceleration lap counting, is easily subjected to interference from the surrounding magnetic fields or large fluctuations in the acceleration data itself. This presents a technical problem that affects the accuracy of lap counting.

SUMMARY

An embodiment of the present invention provides a lap counting method and device. The lap counting method and device are applied to a non-motorized vehicle, and the non-motorized vehicle is provided with a torque sensor, which solves the technical problem in the prior art. Problem being is that the accuracy of lap counting achieved by the lap counting method such as magnetic lap counting or acceleration lap counting is easily subjected to the interference from surrounding magnetic fields or large fluctuations in the acceleration data itself.

In view of the above-mentioned issues, the present invention provides a lap counting method and device according to the proposed embodiments.

The first aspect of the present invention provides a lap counting method. The lap counting method is applied to a non-motorized vehicle, and the non-motorized vehicle is provided with a torque sensor. The lap counting method includes: obtaining data of the torque sensor in real time; obtaining real-time torque data according to the data of the torque sensor; obtaining a change period of the real-time torque data according to the real-time torque data; and determining lap counting data according to the change period, wherein a lap counting marking point is a peak value of the change period.

Preferably, before the real-time cycling data are obtained through the torque sensor, the torque sensor is calibrated by the following steps: obtaining a plurality of external forces of the torque sensor and corresponding torque data; determining whether the differences between the plurality of external forces of the torque sensor and the corresponding torque data are within a first preset threshold separately; and, if the differences between the plurality of external forces of the torque sensor and the corresponding torque data are within the first preset threshold, calculating an average value of the differences between the plurality of external forces of the torque sensor and the corresponding torque data and storing the average value in a memory.

Preferably, the step of determining whether the differences between the plurality of external forces of the torque sensor and the corresponding torque data are within the preset threshold separately further comprises: if the differences between the plurality of external forces of the torque sensor and the corresponding torque data are not within the first preset threshold, determining that a failure occurs in the torque sensor, wherein the torque sensor is not adopted.

Preferably, the step of obtaining the change period of the real-time torque data according to the real-time torque data includes: obtaining a first torque interval according to the change period, wherein a torque in the first torque interval increases gradually; determining whether the first torque interval is within a second preset threshold; and, if the first torque interval is within the second preset threshold, counting the first torque interval as a period start.

Preferably, the step of obtaining the change period of the real-time torque data according to the real-time torque data further comprises: obtaining a second torque interval according to the change period, wherein a torque in the second torque interval decreases gradually; determining whether the second torque interval is within a third preset threshold; and, if the second torque interval is within the third preset threshold, counting the second torque interval as a period end.

The second aspect of the present invention provides a lap counting device. The lap counting device is applied to a non-motorized vehicle, and the non-motorized vehicle is provided with a torque sensor. The lap counting device includes:

a first acquisition unit, wherein the first acquisition unit is configured to obtain data of the torque sensor in real time;

a second acquisition unit, wherein the second acquisition unit is configured to obtain real-time torque data according to the data of the torque sensor;

a third acquisition unit, wherein the third acquisition unit is configured to obtain a change period of the real-time torque data according to the real-time torque data; and a first lap counting unit, wherein the first lap counting unit is configured to determine lap counting data according to the change period, wherein a lap counting marking point is a peak value of the change period.

Preferably, the lap counting device further includes:

a fourth acquisition unit, wherein the fourth acquisition unit is configured to obtain a plurality of external forces of the torque sensor and corresponding torque data;

a first determination unit, wherein the first determination unit is configured to determine whether the differences between the plurality of external forces of the torque sensor and the corresponding torque data are within a first preset threshold separately; and a first execution unit, wherein the first execution unit is configured to, if the differences between the plurality of external forces of the torque sensor and the corresponding torque data are within the first preset threshold, calculate an average value of the differences between the plurality of external forces of the torque sensor and the corresponding torque data, and store the average value in a memory.

Preferably, the lap counting device further includes:

a second execution unit, wherein the second execution unit is configured to, if the differences between the plurality of external forces of the torque sensor and the corresponding torque data are not within the first preset threshold, determine that a failure occurs in the torque sensor, wherein the torque sensor is not adopted.

Preferably, the lap counting device further includes:

a fifth acquisition unit, wherein the fifth acquisition unit is configured to obtain a first torque interval according to the change period, wherein a torque in the first torque interval increases gradually;

a second determination unit, wherein the second determination unit is configured to determine whether the first torque interval is within a second preset threshold; and a third execution unit, wherein the third execution unit is configured to, if the first torque interval is within the second preset threshold, count the first torque interval as a period start.

Preferably, the lap counting device further includes:

a sixth acquisition unit, wherein the sixth acquisition unit is configured to obtain a second torque interval according to the change period, wherein the torque in the second torque interval decreases gradually;

a third determination unit, wherein the third determination unit is configured to determine whether the second torque interval is within a third preset threshold; and a fourth execution unit, wherein the fourth execution unit is configured to, if the second torque interval is within the third preset threshold, count the second torque interval as a period end.

The third aspect of the present invention provides a lap counting device. The lap counting device is applied to a non-motorized vehicle, and the non-motorized vehicle is provided with a torque sensor. The lap counting device includes a memory, a processor and a computer program, wherein the computer program is stored in a memory and executed by the processor, and the processor executes the program to implement the following steps: obtaining data of the torque sensor in real time; obtaining real-time torque data according to the data of the torque sensor; obtaining a change period of the real-time torque data according to the real-time torque data; and determining lap counting data according to the change period, wherein a lap counting marking point is a peak value of the change period.

One or more of the above-mentioned technical solutions in the embodiments of the present invention have at least one or more of the following technical effects.

The embodiments of the present invention provide a lap counting method and device. The lap counting method and device is applied to a non-motorized vehicle, and the non-motorized vehicle is provided with a torque sensor. Data of the torque sensor are obtained in real time; real-time torque data are obtained according to the data of the torque sensor; a change period of the real-time torque data is obtained according to the real-time torque data; and lap counting data are determined according to the change period, and the lap counting marking point is the peak value of the change period. The present invention solves the technical problem in the prior art that the accuracy of lap counting achieved by the lap counting method such as magnetic lap counting or acceleration lap counting is easily subjected to the interference from the surrounding magnetic field or large fluctuations in the acceleration data itself. Besides, the present invention achieves the following technical effects: since the lap counting is performed by means of a periodic change of the torque acting on a crank of a bicycle, data is stable and free from interference caused by external factors, and the lap counting is stable and reliable, thus improving the accuracy, sensitivity and response speed of lap counting and improving the adaptability of lap counting of the bicycle by using a changing trend for lap counting.

The above description is only an overview of the technical solution of the present invention. Hereinafter, the specific embodiments of the present invention are described to facilitate understanding the technical means of the present invention and the implementation thereof in accordance with the contents of the specification, so that the above description and other objectives, features and advantages of the present invention will be more obvious and easy to understand.

Figure 1:
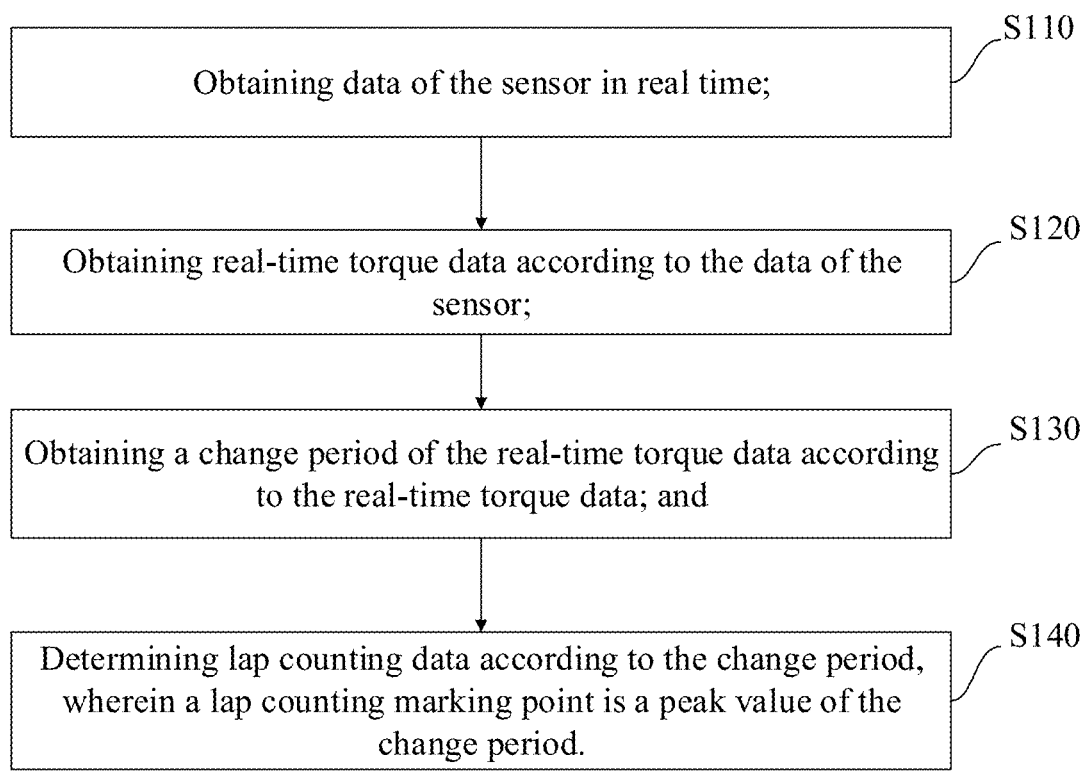
FIG. 1 is a schematic flow chart of the lap counting method according to an embodiment of the present invention.

In the figures: first acquisition unit 11, second acquisition unit 12, third acquisition unit 13, first lap counting unit 14, bus 300, receiver 301, processor 302, transmitter 303, memory 304, and bus interface 306.

DETAILED DESCRIPTION OF THE EMBODIMENTS

An embodiment of the present invention provides a lap counting method and device. The lap counting method and device are applied to a non-motorized vehicle, and the non-motorized vehicle is provided with a torque sensor, aiming to solve the technical problem in the prior art that the accuracy of lap counting achieved by the lap counting method such as magnetic lap counting or acceleration lap counting is easily subjected to the interference from surrounding magnetic fields or large fluctuations in the acceleration data itself.

The general idea of the technical solution provided by the present invention is as follows: data of the torque sensor are obtained in real time; real-time torque data are obtained according to the data of the torque sensor; a change period of the real-time torque data is obtained according to the real-time torque data; and lap counting data are determined according to the change period, and the lap counting marking point is a peak value of the change period. The present invention solves the technical problem in the prior art that the accuracy of lap counting achieved by the lap counting method such as magnetic lap counting or acceleration lap counting is easily subjected to the interference from the surrounding magnetic field or large fluctuations in the acceleration data itself. Besides, the present invention achieves the following effects: since the lap counting is performed by means of a periodic change of the torque acting on a crank of a bicycle, data is stable and free from external factors, and the lap counting is stable and reliable, thus improving the accuracy, sensitivity and response speed of lap counting and improving the adaptability of lap counting of the bicycle by using a changing trend for lap counting.

The technical solution of the present invention is described in detail below in conjunction with the drawings and embodiments. It should be understood that the embodiments as well as the specific features in the embodiments of the present invention are the detailed description of the technical solution of the present invention, rather than a limitation to the technical solution of the present invention. The embodiments as well as the specific features in the embodiments of the present invention can be combined with each other when in no conflict.

Herein, the term "and/or" is only a description of the association relationship of associated objects, indicating that there can be three kinds of relationships, for example, "A and/or B" means that there are three situations: A existing alone, A and B existing simultaneously, and B existing alone. In addition, the character "/" in the description generally indicates that an "or" relationship exists between the previous and following associated objects.

Embodiment 1

FIG. 1 is a schematic flow chart of a lap counting method according to an embodiment of the present invention. As shown in FIG. 1, a lap counting method is applied to a non-motorized vehicle, and the non-motorized vehicle is provided with a torque sensor. The lap counting method includes the following steps.

Step 110: data of the torque sensor are obtained in real time.

Specifically, the torque sensor is mounted on the non-motorized vehicle, for example, the torque sensor is mounted on a bicycle, a spinning bike and other non-motorized vehicles. The torque sensor detects the wheel rotation of the non-motorized vehicle, and the real-time data detected by the torque sensor are received. It should be understood that the torque sensor, also known as torque transducer, torque meter, in the embodiment of the present invention is divided into the dynamic type and the static type. The dynamic torque sensor can also be called torque sensor, torque and speed sensor, non-contact torque sensor, rotary torque sensor and so on. The torque sensor is used to detect the torque applied on various rotating or non-rotating mechanical parts. The torque sensor converts a physical change in the torque into an accurate electrical signal. The torque sensor can be applied to the manufacture of viscometer, electric, pneumatic and hydraulic torque wrenches, which has the advantages of high accuracy, fast frequency response, high reliability, long service life and so on. Torque is the most frequently involved parameter in rotary power systems. Torsion angle phase difference sensors are widely used to detect the rotary torque.

Step 120: real-time torque data are obtained according to the data of the torque sensor.

Specifically, the real-time torque data of the non-motorized vehicle are extracted from the real-time data detected by the torque sensor during the cycling process, and then the torque data are calculated to obtain the real-time external force, namely the torsion force. The external force is calculated by the formula $F=G*(adc-adc0)/adc\_kg$, wherein $adc0$ represents a torque reading corresponding to an external force of 0 kg, and $adc$ represents a value read by the torque sensor. The torsion force refers to a force that twists an object to deform the object and is equal to a torque produced when the object is subjected to a tangential force in the direction of rotation of the object, and the unit for torque is the Newton-metre (N·m).

Step 130: a change period of the real-time torque data is obtained according to the real-time torque data.

Further, the step of obtaining the change period of the real-time torque data according to the real-time torque data includes: a first torque interval is obtained according to the change period, and the torque in the first torque interval increases gradually; it is determined that whether the first torque interval is within a second preset threshold; if the first torque interval is within the second preset threshold, the first torque interval is counted as a period start.

Further, the step of obtaining the change period of the real-time torque data according to the real-time torque data further includes: a second torque interval is obtained according to the change period, and the torque in the second torque interval decreases gradually; it is determined that whether the second torque interval is within a third preset threshold; and if the second torque interval is within the third preset threshold, the second torque interval is counted as a period end.

Figure 2:
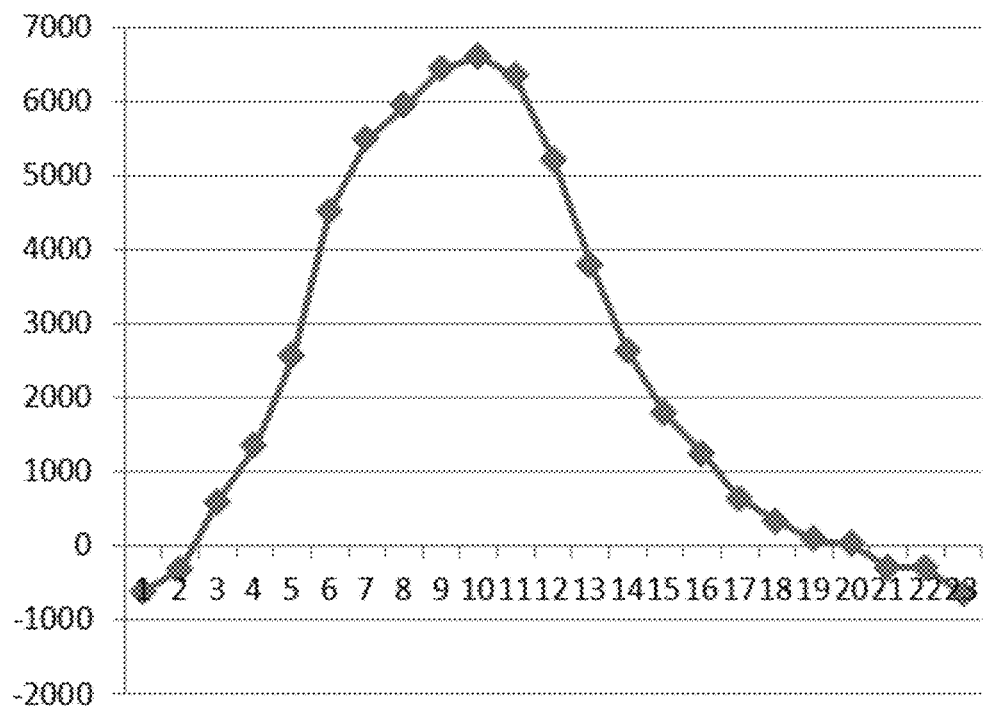
FIG. 2 is a graph showing a real-time torque variation curve of one pedaling cycle according to an embodiment of the present invention.

Specifically, in one pedaling cycle during the normal cycling process of a bicycle, the torque first increases continuously to reach the peak and then decreases continuously. FIG. 2 is a graph showing the real-time torque change in one pedaling cycle, wherein the abscissa represents the number of sampling points collected at uniform time intervals, and the ordinate represents the torque after unit conversion. According to the real-time torque data obtained from the real-time data detected by the torque sensor, each data is collected at uniform time intervals, to obtain the periodic change of the torque. Due to the pedal structure of the bicycle and the human structure, the force of the foot acting on the bicycle changes periodically in one pedaling cycle of the bicycle, and the force reaches a maximum when the crank of the bicycle approaches a horizontal forward position. The force may be a negative force when the crank passes through the lowest point to the highest point of the circle. Affected by temperature and other conditions, the data of the torque sensor may change greatly under different conditions when not subjected to force. Thus, it is not suitable to simply use the maximum and minimum value to determine the start of one pedaling cycle. The algorithm of the present invention uses the change trend to determine the start of one pedaling cycle. For example, when a force increases continuously for n times and its change value is within a certain range, the start of one pedaling cycle is determined. When the force decreases obviously and decreases continuously for n times and its change value is within a certain range, the end of a peak value is determined. The peak value is maintained by applying force necessarily and thus has a short maintaining time. In this regard, the peak value is used as the marking point of lap counting to improve the accuracy.

Step 140: lap counting data are determined according to the change period, and the lap counting marking point is the peak value of the change period.

Specifically, when the torque increases continuously, the period starts, and when the torque decreases continuously, the period ends. The peak value of the period is determined according to the obtained change period of the torque, and the peak value of the period is used as the lap counting marking point. One pedaling cycle is counted when the peak value of the change period of the torque is reached each time, and so on, to obtain accurate lap counting values. Since the peak value maintains for a short time, the marked lap counting is more accurate. Besides, the lap counting is performed by means of a periodic change of the torque acting on the bicycle and is free from interference caused by external factors, so that the lap counting is stable and reliable, which solves the technical problem in the prior art that the accuracy of the lap counting is affected due to the large cadence or data inconsistency since the lap counting method such as magnetic lap counting or acceleration lap counting is easily subjected to the interference from the surrounding magnetic field or large fluctuations in the acceleration data itself. The present invention improves the accuracy, sensitivity and response speed of lap counting and improves the adaptability of lap counting of the bicycle by using a changing trend for lap counting.

Further, before the real-time cycling data are obtained through the torque sensor, the torque sensor is calibrated by the following steps: a plurality of external forces of the torque sensor and the corresponding torque data are obtained; it is determined that whether the differences between the plurality of external forces of the torque sensor and the corresponding torque data are within a first preset threshold separately; if the differences between the plurality of external forces of the torque sensor and the corresponding torque data are within the first preset threshold, an average value of the differences between the plurality of external forces of the torque sensor and the corresponding torque data is calculated and stored in a memory.

Further, the step of determining whether the differences between the plurality of external forces of the torque sensor and the corresponding torque data are within the preset threshold separately further includes: if the differences between the plurality of external forces of the torque sensor and the corresponding torque data are not within the first preset threshold, it is determined that a failure occurs in the torque sensor, and the torque sensor is not adopted.

Specifically, in order to improve the accuracy of lap counting by means of the peak value of the period, the torque sensor mounted on the non-motorized vehicle, such as a bicycle and the like, should be calibrated to ensure real-time torque calculation and lap counting identification in the cycling process. The calibration process of the torque sensor is as follows: since the torque sensor can sense the external force and change the reading according to the magnitude of the external force, at the time of leaving the factory, the parameters (external force and corresponding torque data) of each hardware are measured and collected; a plurality of external forces are separately applied to the pedal, the corresponding values are read by the torque sensor to obtain the torque value under each external force; each group of the read data are calculated to obtain the corresponding torque change under each unit weight; and it is determined that whether the torque sensor is accurate according to the torque change value under each unit weight. For example, a 20 kg weight and a 40 kg weight are hung on the crank pedal of a bicycle successively, and the readings of the torque sensor without external force, under the 20 kg weight, and under the 40 kg weight, are recorded, respectively. The data of the relationship between the readings of the torque sensor and the corresponding actual external forces are calculated and stored. The sensor readings corresponding to 0, 20 kg and 40 kg are represented by adc0, adc20 and adc40, respectively. Accordingly, the adc change corresponding to the weight change per kilogram is calculated as follows: adc_kg1= (adc20−adc0)/20, adc_kg2=(adc40−adc20)/20. If the difference between adc_kg1 and adc_kg2 is relatively small and meets the standard range, then the weight of the torque sensor is accurate, and the average value of adc_kg1 and adc_kg2 is calculated and recorded in the memory. If the difference between adc_kg1 and adc_kg2 is excessively large, then it means that the torque sensor has a linear problem, that is, a structure or hardware failure. In this way, the accuracy of the torque data is ensured, which provides strong support for the technical effect of improving the accuracy, sensitivity, response speed and adaptability of lap counting of the bicycle.

Embodiment 2

Figure 3:
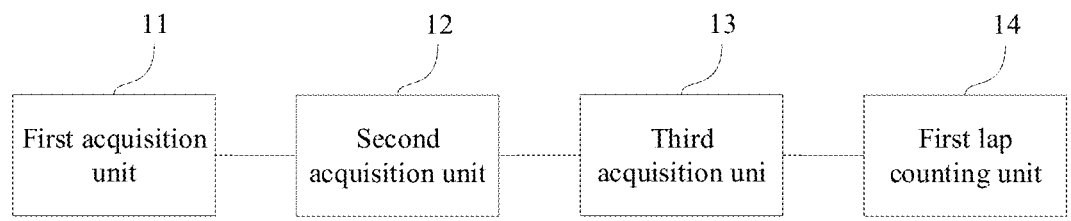
FIG. 3 is a schematic diagram of the structure of a lap counting device according to an embodiment of the present invention.

Based on the same inventive idea as the lap counting method in the aforementioned embodiment, the present invention further provides a lap counting device. The lap counting device is applied to a non-motorized vehicle, and the non-motorized vehicle is provided with a torque sensor. As shown in FIG. 3, the lap counting device includes:

the first acquisition unit 11, wherein the first acquisition unit 11 is configured to obtain data of the torque sensor in real time;

the second acquisition unit 12, wherein the second acquisition unit 12 is configured to obtain real-time torque data according to the data of the torque sensor;

the third acquisition unit 13, wherein the third acquisition unit 13 is configured to obtain a change period of the real-time torque data according to the real-time torque data; and the first lap counting unit 14, wherein the first lap counting unit 14 is configured to determine lap counting data according to the change period, wherein a lap counting marking point is a peak value of the change period.

Further, the lap counting device further includes:

a fourth acquisition unit, wherein the fourth acquisition unit is configured to obtain a plurality of external forces of the torque sensor and corresponding torque data;

a first determination unit, wherein the first determination unit is configured to determine whether the differences between the plurality of external forces of the torque sensor and the corresponding torque data are within a first preset threshold separately; and a first execution unit, wherein the first execution unit is configured to, if the differences between the plurality of external forces of the torque sensor and the corresponding torque data are within the first preset threshold, calculate an average value of the differences between the plurality of external forces of the torque sensor and the corresponding torque data and store the average value in a memory.

Further, the lap counting device further includes:

a second execution unit, wherein the second execution unit is configured to, if the differences between the plurality of external forces of the torque sensor and the corresponding torque data are not within the first preset threshold, determine that a failure occurs in the torque sensor, wherein the torque sensor is not adopted.

Further, the lap counting device further includes:

a fifth acquisition unit, wherein the fifth acquisition unit is configured to obtain a first torque interval according to the change period, wherein the torque in the first torque interval increases gradually;

a second determination unit, wherein the second determination unit is configured to determine whether the first torque interval is within a second preset threshold; and a third execution unit, wherein the third execution unit is configured to, if the first torque interval is within the second preset threshold, count the first torque interval as a period start.

Further, the lap counting device further includes:

a sixth acquisition unit, wherein the sixth acquisition unit is configured to obtain a second torque interval according to the change period, wherein the torque in the second torque interval decreases gradually;

a third determination unit, wherein the third determination unit is configured to determine whether the second torque interval is within a third preset threshold; and a fourth execution unit, wherein the fourth execution unit is configured to, if the second torque interval is within the third preset threshold, count the second torque interval as a period end.

The various variations and specific examples of the lap counting method in Embodiment 1 with reference to FIG. 1 are also applicable to the lap counting device of the present embodiment. Through the detailed description of the lap counting method mentioned above, those skilled in the art can clearly know the implementation method of the lap counting device in the present embodiment, which is thus not detailed herein for the simplicity of the specification.

Embodiment 3

Based on the same inventive idea as the lap counting method in the aforementioned embodiment, the present invention further provides a lap counting device, and a computer program is stored in the lap counting device. The computer program is executed by the processor to implement any step of the lap counting method mentioned as above.

Figure 4:
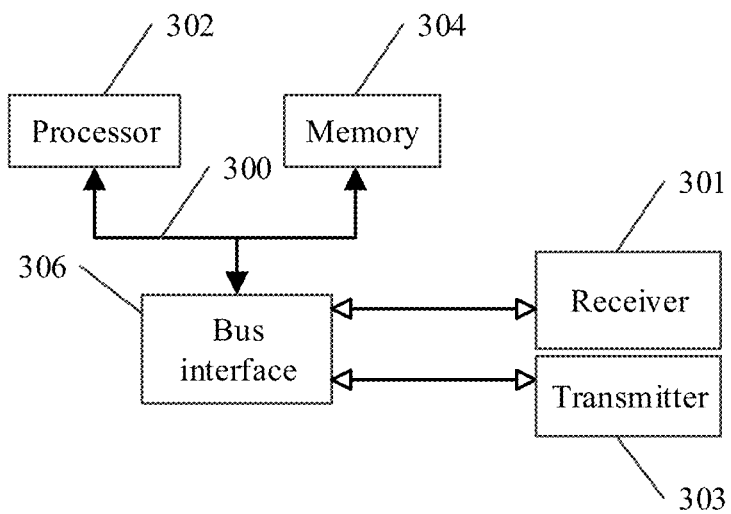
FIG. 4 is a schematic diagram of the structure of another lap counting device according to an embodiment of the present invention.

Specifically, as shown in FIG. 4, the bus architecture is represented by the bus 300. The bus 300 includes any number of interconnected buses and bridges. The bus 300 links various circuits including one or more processors represented by the processor 302 and the memory represented by the memory 304 together. The bus 300 may also link various other circuits, such as peripherals, voltage regulators and power management circuits and the like, which are well known in the art and are therefore not described further herein. The bus interface 306 provides interfaces between the bus 300, the receiver 301 and the transmitter 303. The receiver 301 and the transmitter 303 may be an identical element, e.g. a transceiver, which is used as a unit for communicating with various other devices on the transmission medium.

The processor 302 is configured to manage the bus 300 and general processing, and the memory 304 is configured to store the data used by the processor 302 when performing an operation.

One or more of the above-mentioned technical solutions in the embodiments of the present invention have at least one or more of the following technical effects.

The embodiments of the present invention provide a lap counting method and device. The lap counting method and device is applied to a non-motorized vehicle, and the non-motorized vehicle is provided with a torque sensor. Data of the torque sensor are obtained in real time; real-time torque data are obtained according to the data of the torque sensor; a change period of the real-time torque data is obtained according to the real-time torque data; and lap counting data are determined according to the change period, and the lap counting marking point is the peak value of the change period. The present invention solves the technical problem in the prior art that the accuracy of lap counting achieved by the lap counting method such as magnetic lap counting or acceleration lap counting is easily subjected to the interference from the surrounding magnetic field or large fluctuations in the acceleration data itself. Besides, the present invention achieves the following effects: since the lap counting is performed by means of a periodic change of the torque acting on a crank of a bicycle, the data is stable and free from external factors, and the lap counting is stable and reliable, thus improving the accuracy, sensitivity and response speed of lap counting and improving the adaptability of lap counting of the bicycle by using a changing trend for lap counting.

It should be understood by those skilled in the art that the embodiments of the present invention may be provided as a method, a system, or a computer program product. Therefore, the present invention may adopt the form of complete hardware embodiments, complete software embodiments, or embodiments combining both software and hardware. Furthermore, the present invention may adopt the form of a computer program product implemented on one or more computer-usable storage media (including, but not limited to, disk memory, compact disc read-only memory [CD-ROM], optical memory, and others) containing computer-usable program codes.

The present invention is described with reference to a method, a device (system), and a flow chart and/or block diagram of a computer program product according to an embodiment of the present invention. It should be understood that each process and/or block in the flow chart and/or block diagram, as well as the combination of the processes and/or blocks in the flow chart and/or block diagram, can be implemented by computer program instructions. These computer program instructions may be provided to a processor of a general-purpose computer, special-purpose computer, embedded processor or other programmable data processing device to generate a machine so that the instructions are executed by the processor of the computer or other programmable data processing device to generate a device for performing the function specified in one or more processes in the flow chart and/or one or more blocks in the block diagram.

These computer program instructions can also be stored in a computer-readable memory capable of guiding the computer or other programmable data processing device to work in a specific manner so that instructions stored in the computer-readable memory produce a manufacturing product including an instruction device, and the instruction device performs the function specified in one or more processes in the flow chart and/or one or more blocks in the block diagram.

These computer program instructions may also be loaded on the computer or other programmable data processing device, so that the computer or other programmable data processing device performs a series of operating steps to produce computer-implemented processing, and then the instructions are executed by the computer or other programmable data processing device to provide steps for performing the function specified in one or more processes in the flow chart and/or one or more blocks in the block diagram.

Obviously, those skilled in the art can make various changes and modifications to the present invention without departing from the spirit and scope of the present invention. In this way, if these changes and modifications to the present invention fall within the scope of the claims of the present invention and equivalent technology thereof, the present invention is also intended to include these modifications and variants.

What is claimed is:

1. A lap counting method applied to a non-motorized vehicle, comprising:
   obtaining data of a torque sensor in real time, wherein the torque sensor is provided in the non-motorized vehicle;
   obtaining real-time torque data according to the data of the torque sensor;
   obtaining a change period of the real-time torque data according to the real-time torque data; and
   determining lap counting data according to the change period, wherein a lap counting marking point is a peak value of the change period.

2. The lap counting method of claim 1, wherein before the real-time cycling data are obtained through the torque sensor, the torque sensor is calibrated by the following steps:
   obtaining a plurality of external forces of the torque sensor and torque data corresponding to the plurality of external forces of the torque sensor;
   determining whether differences between the plurality of external forces of the torque sensor and the torque data corresponding to the plurality of external forces of the torque sensor are within a first preset threshold separately; and
   when the differences between the plurality of external forces of the torque sensor and the torque data corresponding to the plurality of external forces of the torque sensor are within the first preset threshold, calculating an average value of the differences between the plurality of external forces of the torque sensor and the torque data corresponding to the plurality of external forces of the torque sensor and storing the average value in a memory.

3. The lap counting method of claim 2, wherein the step of determining whether the differences between the plurality of external forces of the torque sensor and the torque data corresponding to the plurality of external forces of the torque sensor are within the preset threshold separately further comprises:
   when the differences between the plurality of external forces of the torque sensor and the torque data corresponding to the plurality of external forces of the torque sensor are not within the first preset threshold, determining that a failure occurs in the torque sensor, wherein the torque sensor is not adopted.

4. The lap counting method of claim 1, wherein the step of obtaining the change period of the real-time torque data according to the real-time torque data comprises:
   obtaining a first torque interval according to the change period, wherein a first torque in the first torque interval increases gradually;
   determining whether the first torque interval is within a second preset threshold; and
   when the first torque interval is within the second preset threshold, counting the first torque interval as a period start.

5. The lap counting method of claim 4, wherein the step of obtaining the change period of the real-time torque data according to the real-time torque data further comprises:
   obtaining a second torque interval according to the change period, wherein a second torque in the second torque interval decreases gradually;
   determining whether the second torque interval is within a third preset threshold; and
   when the second torque interval is within the third preset threshold, counting the second torque interval as a period end.

6. A lap counting device applied to a non-motorized vehicle, wherein the non-motorized vehicle is provided with a torque sensor; the lap counting device comprises:
   a first acquisition unit, wherein the first acquisition unit is configured to obtain data of the torque sensor in real time;
   a second acquisition unit, wherein the second acquisition unit is configured to obtain real-time torque data according to the data of the torque sensor;
   a third acquisition unit, wherein the third acquisition unit is configured to obtain a change period of the real-time torque data according to the real-time torque data; and
   a first lap counting unit, wherein the first lap counting unit is configured to determine lap counting data according to the change period, and a lap counting marking point is a peak value of the change period.

7. A lap counting device applied to a non-motorized vehicle, wherein the non-motorized vehicle is provided with a torque sensor; the lap counting device comprises a memory, a processor and a computer program, wherein the computer program is stored in a memory and executed by the processor, and the processor executes the computer program to implement the following steps:
   obtaining data of the torque sensor in real time;
   obtaining real-time torque data according to the data of the torque sensor;
   obtaining a change period of the real-time torque data according to the real-time torque data; and
   determining lap counting data according to the change period, wherein a lap counting marking point is a peak value of the change period.

* * * * *